Dec. 28, 1943.  H. C. HUEGLIN  2,337,719
FAN
Filed June 10, 1940  3 Sheets-Sheet 1
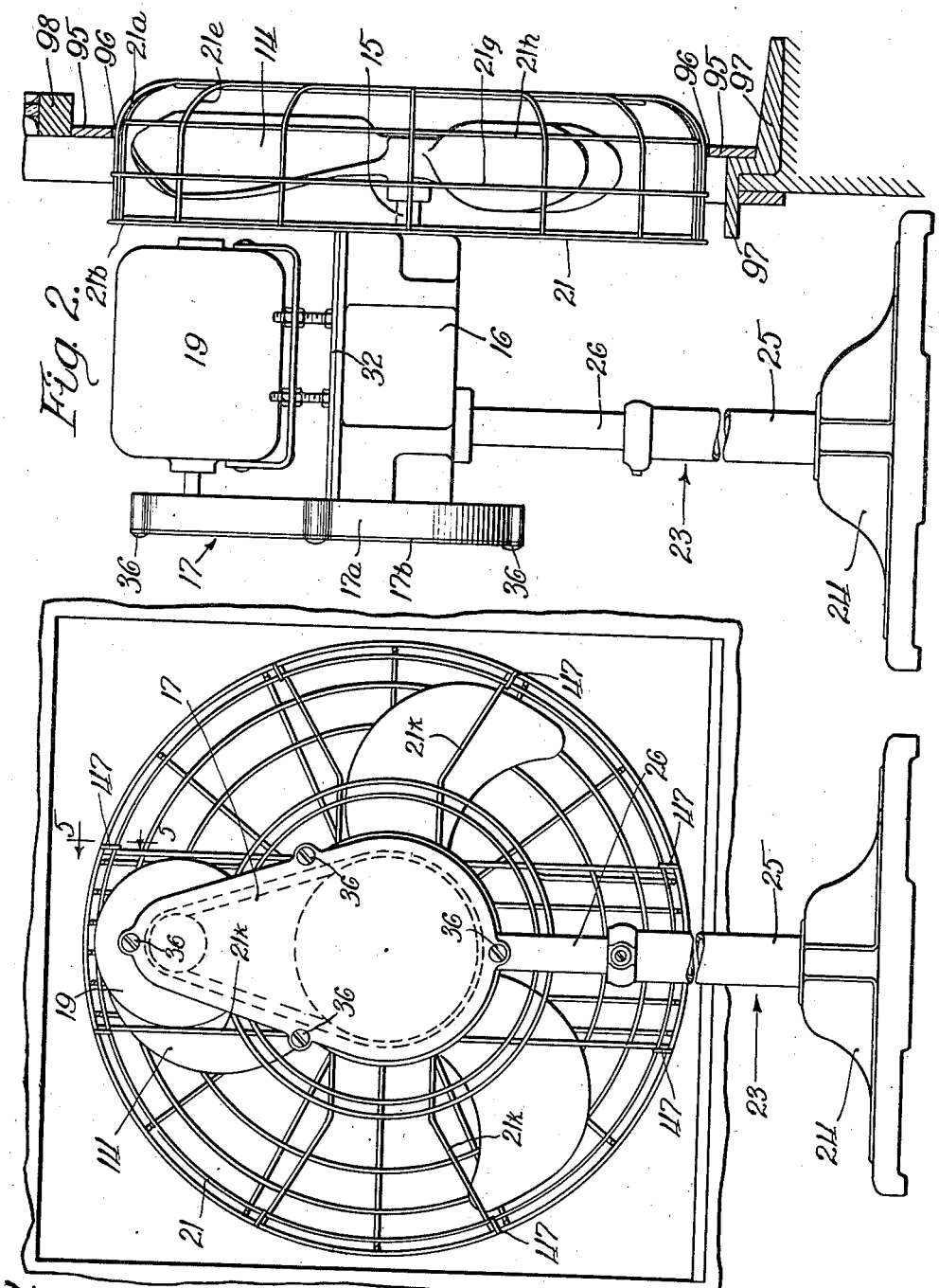
Inventor:
Herman C. Hueglin
By Brown, Jackson, Boettcher & Dienner
Attys.

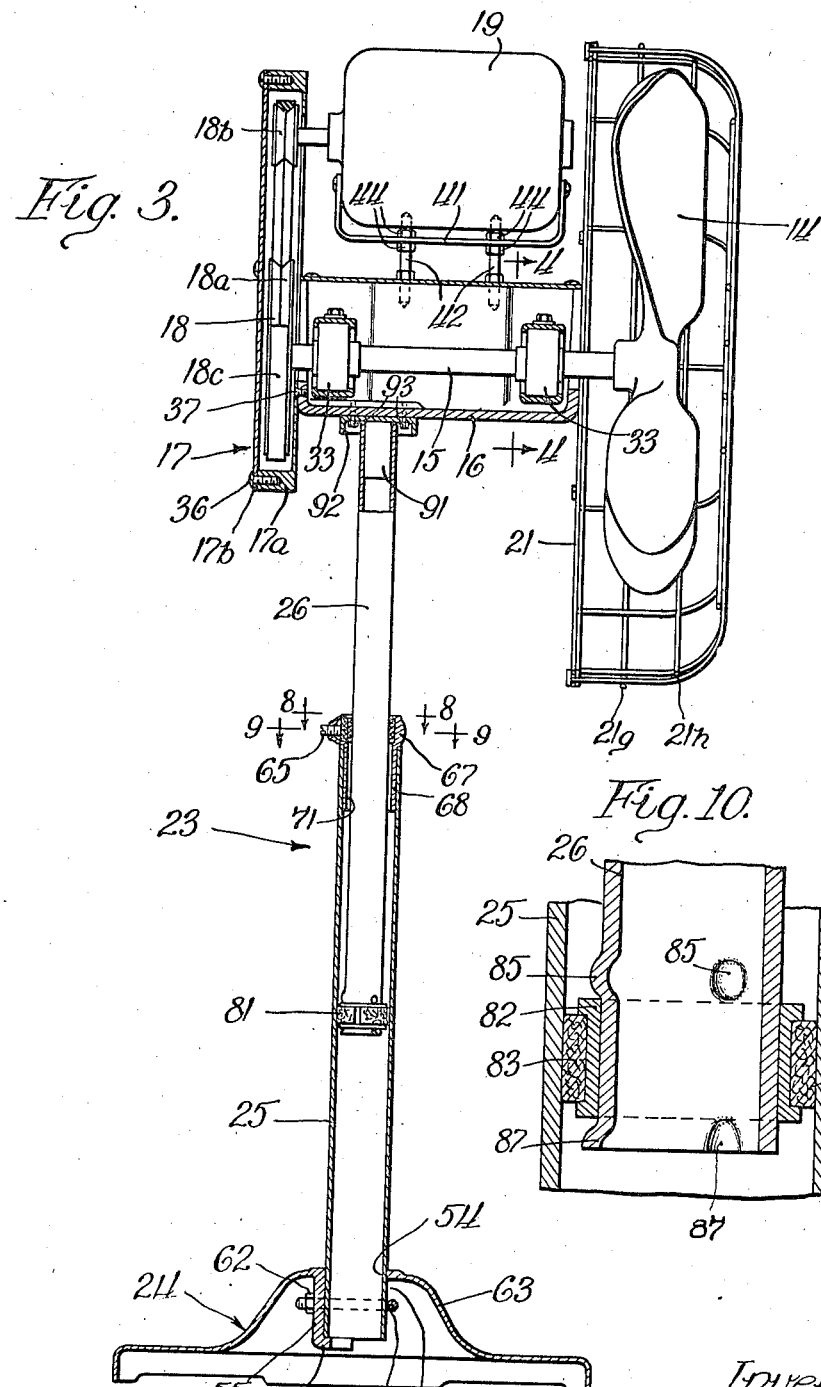

Dec. 28, 1943.  H. C. HUEGLIN  2,337,719
FAN
Filed June 10, 1940   3 Sheets-Sheet 3
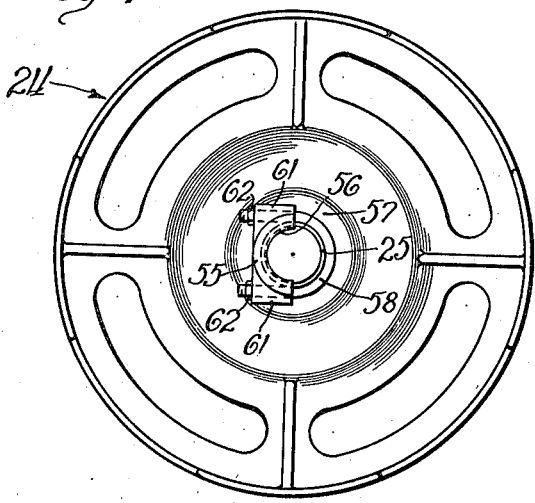
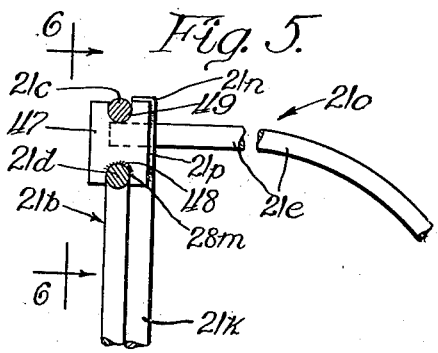
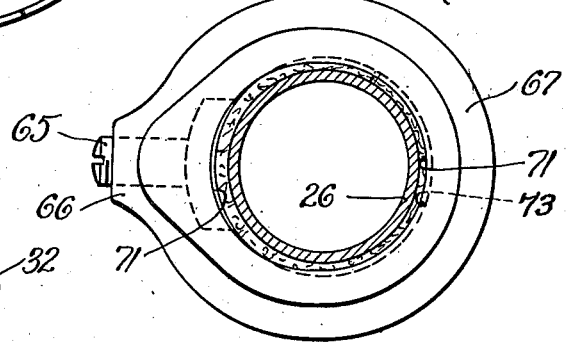
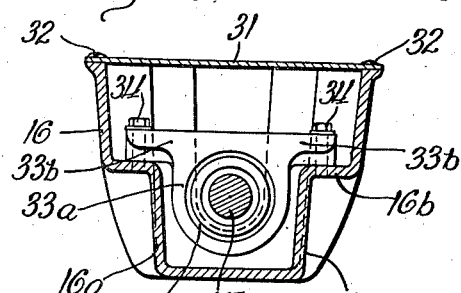
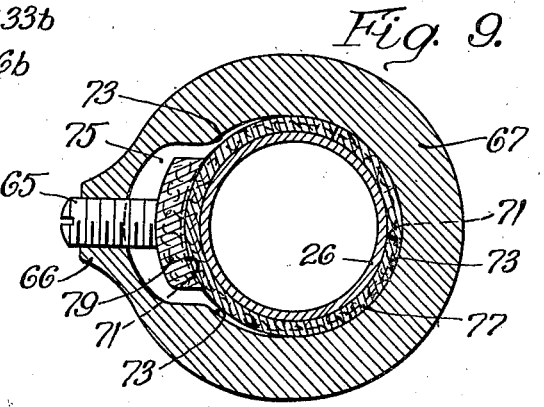
Inventor:
Herman C. Hueglin
By Brown, Jackson, Boettcher & Dienner
Attys Patented Dec. 28, 1943

2,337,719

UNITED STATES PATENT OFFICE 2,337,719

FAN

Herman C. Hueglin, Chicago, Ill., assignor to Airmaster Corporation, Chicago, Ill., a corporation of Illinois Application June 10, 1940, Serial No. 339,648

6 Claims. (Cl. 248—161)

The present invention relates to fans, and has particular reference to portable home cooling fans of the type adapted to discharge air from a window of the home. While this is the principal utility of the invention in its entirety, it will be apparent from the appended description of the fan that some of the structural features thereof are not necessarily limited to this home cooling type of fan.

A very prevalent method of cooling houses and other buildings not equipped with air conditioning apparatus is to provide a large exhaust fan adapted to blow heated air from the house through an open window or other large opening in the building, in such relation as to induce a cooling flow of air into and through the building. For example, these fans are frequently used in the attics and upper floors of small homes, where they serve to discharge to the outdoors the heated air tending to collect in the attic or upper floor of the house. This causes the cooler air to enter the lower part of the house and circulate upwardly therethrough.

In very hot weather, these home cooling fans are operated over long periods of time, frequently all night long. Hence, it is practically essential that a fan for this purpose be extremely quiet in its operation. Quietness is assured primarily by a low speed of rotation of the fan. I have found that approximately 600 R. P. M. is about the maximum speed to be employed in the smaller fans of this type, in order to obtain the desired quietness of operation. In the large sizes of fans of this type, the speeds are preferably still lower, being down around 400 R. P. M. or even less. The provision of an electric motor having the desired horsepower rating at these relatively low speeds of 400 to 600 R. P. M. immediately introduces very definite problems in cost and size. For example, a motor having a normal running speed of approximately 560 R. P. M. costs approximately four times as much as a motor of the same horsepower rating but having a normal running speed of approximately 1725 R. P. M. Furthermore, these extremely slow speed motors are of relatively large size, greatly increasing the weight of the unit, and also creating a relatively large blocking or turbulence area behind the fan when the fan and motor are mounted in direct coupled relation.

In order to secure these relatively low fan speeds for quietness of operation, while retaining the relatively high motor speeds, I employ a speed reducing drive which embodies several unique features. The drive is of the belt type, for maximum quietness of operation, and this belt drive is of such nature that different sheave ratios may be employed interchangeably, for adapting the same drive unit to fans of different sizes and different speeds. The drive unit comprises a unique relation of fan shaft housing, a relatively long fan shaft journaled in bearings which have cushioned mounting a substantial distance apart in said housing, a belt drive extending upwardly from the rear end of said fan shaft housing, and an electric motor adjustably mounted on the top of said fan shaft housing and connected with said belt drive. This drive unit is adapted for use with a wide variety of fan sizes, the belt drive ratio, and in some instances the power of the motor, being the only variations in adapting this unit to the different sizes of fans. The fan is mounted on the slow speed fan shaft at the front end of the fan shaft housing, and is protected by a wire guard which is secured to the fan shaft housing.

When my invention is embodied in the preferred form of a portable unit, the above-described drive unit, fan, and fan guard have mounting on a pedestal which rests on the floor. This pedestal comprises a base casting from which rises an adjustable standard, to the upper end of which is secured the fan shaft housing. Another feature of the invention pertains to an improved overhanging relation of the fan and fan guard with respect to the adjacent edge of the base casting. The fan and fan guard usually extend into a relatively large opening which is cut in a solid window panel disposed in the open window. By virtue of the aforementioned overhang of the fan and guard with respect to the base casting, the unit can be disposed in this relation in the window while still being supported by the base casting resting on the floor. Also, the entire fan unit remains supported in stable equilibrium on the base casting and upright standard when the fan and fan guard are not disposed in the opening of the window panel, from which it will be seen that the fan unit can further be employed as a general utility or circulating fan adapted for use in any part of the room.

Other features of the invention pertain to improvements in the construction of the supporting pedestal.

Other features of the invention pertain to an improved construction of fan guard.

Still other features, objects, and advantages of the invention will be apparent from the following detail description of one preferred embodiment thereof.

In the accompanying drawings illustrating such embodiment:

Figure 1 is a fragmentary rear elevational view showing the fan disposed in a window opening.

Figure 2 is a similar side elevational view showing the fan disposed in a window opening.

Figure 3 is a side view, with most of the parts illustrated in section.

Figure 4 is a transverse sectional view through the fan shaft housing, taken approximately on the plane of the line 4—4 of Figure 3.

Figure 5 is a fragmentary detail sectional view, taken approximately on the planes of the lines 5—5 of Figures 1 and 6, and showing the locking relation between the two sections of the fan guard;

Figure 6 is a fragmentary side elevational view, corresponding to a view taken on the plane of the line 6—6 of Figure 5, showing the details of one of the locking clips which establish the releasable locking relation between the fan guard sections;

Figure 7 is a bottom or inverted plan view looking upwardly into the pedestal base which supports the unit;

Figure 8 is a transverse sectional view through the upper tube of the adjustable supporting standard, corresponding to the section taken on the plane of the line 8—8 of Figure 3;

Figure 9 is a similar view, corresponding to a section taken on the plane of the line 9—9 of Figure 3; and Figure 10 is a longitudinal detail sectional view through the guide head on the lower end of the adjustable upper tube.

The main elements of the construction comprise the fan 14 mounted on the fan shaft 15 which is journaled within the fan shaft housing 16. The rear end of the fan shaft projects from the housing 16 into a belt drive housing 17 where it is connected with a belt drive 18. This belt drive is connected with the electric motor 19 which is adjustably mounted on top of the fan shaft housing 16. The fan guard 21 enclosing the fan 14 is secured to the front end of the housing 16. The above assembly is supported on an adjustable pedestal 23 comprising the supporting base 24, lower fixed column 25, and upper adjustable column or tube 26.

The fan shaft housing 16 is of trough-shaped form comprising closed side and bottom walls and an open top. A removable cover plate 31 closes this open top of the housing, being removably secured thereto by the screws or bolts 32. The bearings which mount the fan shaft 15 within the housing 16 are indicated at 33, there being one of these bearings adjacent each end of the housing, such arrangement enabling the bearings to be spaced a considerable distance apart. As shown in Figure 4, each bearing comprises an outer block or mounting pedestal 33a from which project the laterally extending bolting lugs 33b. Adjacent to its front and rear ends, the casing 16 has indented side wall portions 16a which form horizontal mounting shoulders 16b to which the bolting lugs 33b are secured by the bolts or cap screws 34. The bearings 33 are preferably ball bearings having adequate thrust capacity to carry the end thrust of the fan 14. The outer bearing races are mounted in rubber in the blocks 33a, which makes the two bearings self-aligning, and also eliminates all noise and vibration of the shaft. These bearings are preferably of the sealed type which do not require further lubrication or attention. To meet the requirements for a wide variety of installations, I preferably construct my improved fan in four or five different sizes, but the above-described assembly of fan shaft 15, housing 16, and bearing arrangement 33 constitutes a standard unit on which all different sizes of fans 14 are mounted.

The belt driving housing 17 comprises the main housing portion 17a and the cover portion 17b, these being secured together by the screws 36. This housing assembly is releasably secured to the rear end wall of the fan shaft housing 16 by bolts or screws 37 which are accessible from within the housing 17. The fan shaft 15 extends through the rear end of the housing 16 and into the housing 17, where it carries a relatively large belt sheave or pulley 18a. The shaft of the electric motor 19 extends into the upper portion of the housing 17 and carries a relatively small sheave 18b, and traveling over these two sheaves is the belt 18c. This is preferably a V-belt drive, which is capable of efficient operation at relatively large speed reductions, and with a relatively short distance between sheave centers. In adapting the fan shaft and housing assembly 15—16 to the mounting of different size fans, different speed ratios of the belt drive 18 are preferably substituted. For example, the speed reduction may range from a ratio of 1 to 3 to a ratio of 1 to 5. In adapting the apparatus to a considerable change of speed ratio, two or three different sizes of fan housings 17 are adapted for interchangeable mounting on the rear end of the fan shaft housing 16.

As previously remarked, the electric motor 19 is mounted above the fan shaft housing in the space between the belt drive housing and the fan guard 21. This motor may be of any desired type, most alternating current installations being of the single phase capacitor type. The shaft of the motor 19 enters the belt drive housing section 17a through an opening sufficiently large to permit the motor to be adjusted for obtaining proper belt tension and proper belt alignment. Such adjustable mounting of the motor is afforded by straps or a U-shaped frame 41 secured to the ends of the motor, and apertured to receive the mounting studs 42. These studs screw into the cover plate 31, or are secured thereto by nuts, and threading over the upper ends of said studs are adjusting nuts 44 which engage the upper and lower sides of the member or members 41, the adjustment of these nuts enabling the motor to be raised and lowered, and also enabling it to be inclined fore and aft for any alignment adjustment of the belt sheave 18b. Such adjustable mounting of the motor facilitates the substitution of different motors, and also the substitution of different belt drive transmissions 18, in adapting the drive unit to the use of different size fans.

Referring now to the fan guard 21, particularly as illustrated in Figures 5 and 6, this guard is composed of front and rear sections which are joined by an improved relation of locking detents which permit the sections to be readily assembled and disassembled so as to facilitate the manufacture, shipment, erection, etc. The front section is designated 21a in its entirety, being preferably of dished or bowl-shaped formation to extend across the front of the fan 14 and to surround the periphery of the same. The rear section of the guard is designated 21b in its entirety, this section being preferably of flat or disc-like formation. Both sections are preferably constructed of round wire stock, although it will be understood that either or both sections may be constructed in whole or in part of flat ribbon stock, expanded sheet material, or other fabrications. In the preferred construction illustrated, the rear edge of the front section 21a is formed with a circular wire 21c having its ends joined as a continuous loop or hoop. Similarly, the flat rear section 21b is formed with an outer peripheral wire 21d which likewise has its ends joined to form a continuous loop or hoop. The latter ring 21d is of slightly smaller diameter than the ring 21c so that the rear section of the guard can be assembled within the rear edge of the front section, with the rings 21d and 21c lying substantially in the same transverse plane, as shown in Figure 5. The front section of the guard also comprises the angularly spaced wires 21e which extend forwardly from the ring 21c and then extend radially inwardly to the center of the front section. These wires 21e have their rear ends welded to the outer ring 21c, as indicated at 21f (Figure 6). Circumferential wires 21g, 21h, etc., are welded to these angularly spaced wires 21e. The flat inner section of the guard comprises a plurality of angularly spaced wires 21k which have their outer ends welded to the wire ring 21d, and which extend generally inwardly toward the center of the guard. Successively smaller wire rings may be welded to these inwardly extending wires 21k of the rear section if desired. The two guard sections 21a and 21b are adapted to be secured together by a snap lock detent relation afforded by detent clips 47 which are welded to the rear section 21b at a plurality of angularly spaced points around its periphery. These detent clips are identical stampings punched from flat stock and formed with semi-circular notches or depressions 48 and 49 in their inner and outer edges (Figure 5). The inner notch of each clip is welded over the outer surface of the wire ring 21d, as indicated at 28m. At each angularly spaced point at which one of these detent clips 47 is disposed, a wire 21k is located alongside the clip and has an outer end portion 21n which extends substantially to the outer edge of the clip. The adjacent vertical edge of the clip is welded to the side surfaces of this wire portion 21n, as indicated at 21p. Such welded relation of the clips to the wires 21k reinforces the clips against lateral and inward and outward stresses. In the operation of joining the two sections of the guard together, it is only necessary to force the outer ring 21c over the outer edge of each clip 47 for snapping into the outer notch 49 of the clip. This can be readily accomplished by inserting a screw driver or any other prying tool between the two rings 21c and 21d for displacing a part of the outer ring outwardly and a part of the inner ring inwardly, thereby enabling the outer ring to move in across the outer edge of the clip 47. In such relative prying motion, the wires 21k are only subjected to a relatively slight compression stress, under which they are quite free to yield. The reverse operation of separating the two sections of the guard merely requires the reverse steps of prying the rings 21c and 21d apart and then pulling the sections apart axially. The wires of the inner section 21b of the guard are detachably secured to the front end wall of the fan shaft housing 16 by screws or in any other preferred manner.

Referring now to the supporting pedestal 22, and with particular reference to the base 24 and the mounting of the standard 25 therein, it will be seen from Figures 3 and 7 that the base 24 consists of a heavy casting of circular or disk-like formation. Recessed up into the underside of this base is a cavity for accommodating a mounting socket and clamping means for mounting the standard 25, this cavity being closed over by the dome-shaped cover portion 63. Extending down through this cover portion into the cavity is a central socket 54 in which the lower end of the supporting tube 25 is stepped. This socket comprises a vertical side wall 55 of semi-cylindrical cross section, extending downwardly from the top opening in the base. An abutment shoulder 56 projects inwardly from around the lower edge of the semi-cylindrical socket wall 55, this shoulder forming an end stop against which the end of the tube 25 engages in its stepped mounting in the socket. The open or cut-away side 57 of the socket 54—55 receives the loop of a U-bolt 58. As shown in Figure 7, the side portions of the vertical socket wall 55 are formed with apertured bosses 61 through which the ends of the U-bolt pass. Nuts 62 screw over the threaded ends of the U-bolt, against the bosses 61, and draw the tube 25 into rigid clamping engagement against the socket wall 55. The raised central portion 63 of the base provides for convenient disposal of and access to the above-described mounting parts 55—58, while still concealing these parts from view.

The fan is adjustable to any desired height by the vertical telescopic movement of the upper tube 26 within the lower tube 25. Any desired adjustment is maintained by tightening a set screw 65 which is mounted at the upper end of the lower tube 25. This set screw does not engage the inner tube 26 directly, but creates a friction lock by a unique relation of fabric ring and pressure block engaging said inner tube 26, this improved construction avoiding any marring of the surface of the inner tube, and also avoiding the necessity of any machined parts. Referring to the details of this improved construction, as illustrated in Figures 3, 8, and 9, the set screw 65 has threaded mounting in a laterally projecting boss 66 extending from a head casting 67 which is mounted in the upper end of the lower tube 25. Referring to Figure 3, this head casting comprises a depending skirt portion 68 which has a drive or force fit into the upper end of tube 25. The head 67 and its skirt portion 68 are formed with a bore 71 which is elongated into an approximately elliptical or oval formation, the major axis of which lies in the vertical axial plane of the set screw 65. Also formed in the head portion 67 is an internal annular groove 73 which lies substantially in the horizontal plane of the set screw 65. The groove 73 is formed with substantially the same degree of eccentricity or elongation as the bore 71, and with the major axis thereof extending in the same direction. One side of this internal annular groove 73 opens into a relatively deep pocket or recess 75, into the center of which the set screw 65 extends. A strip of pliable material 77 is coiled into a ring and snapped into the internal annular groove 73, this ring 77 being preferably composed of brake lining fabric or other similarly treated fabric or friction composition. An arcuate pressure block 79 is set into the recess 75, to receive the end thrust of the set screw 65 and transmit said thrust through the friction ring 77 to the adjacent side of the tube 26. This pressure block 79 is preferably composed of fiber or other similar rigid material. The eccentricity of the internal groove 73 is preferably equal to about one-half of the thickness of the friction ring 77. It will be evident that tightening the set screw 65 exerts a heavy clamping pressure against diametrically opposite surfaces of the tube 26, one of these surfaces corresponding in area substantially to the inner arcuate face of the pressure block 79 pressing against the tube through the interposed friction ring 77, and the diametrically opposite friction surface being of approximately the same area, created through the force transmitted between the tube 26 and the internal groove 73, through the body of the friction ring 77. The eccentricity of the bore 71 and internal groove 73 are so proportioned with respect to the head 67 and sleeve 68 that when the tube 26 is in this clamped position it extends substantially in axial prolongation of the lower tube 25. Loosening the set screw 65 releases the clamping pressure at the diametrically opposite areas referred to, whereupon the upper tube 26 can be slid freely upwardly or downwardly within the lower tube. The above-described construction avoids any marring of the tube 26, and requires no machining operations other than the tapping of the bore for the set screw 65.

The lower end of the inner tube 26 is provided with an improved guide head 81 which has a snug sliding fit within the tube 25. Referring to Figure 10, this guide head comprises a channel-shaped ring 82 which fits up over the lower end of tube 26. Engaging within the external groove of this channel ring is a ring of fabric 83, which may be similar in composition to the friction ring 73. Said ring 83 has a snug sliding engagement within the tube 25. Annularly spaced projections 85 are crimped or bumped outwardly from the body of the tube 26 to form in effect an upper shoulder against which the channel ring 82 engages. After the ring has been assembled up against the projections 85, the lower extremity of the tube 26 is crimped or punched outwardly at a plurality of points to form a ring of projections 87 which prevent displacement of the channel ring 82 downwardly off the lower end of the tube 26. This construction of guide head affords a silent, non-rattling guided relation of the lower end of the tube 26 within the tube 25, without requiring any machining operations. The upper end of the upper tube 26 has rigid engagement over a boss or stem 91 which extends downwardly from an attaching head 92 that is secured to the bottom wall of the fan shaft housing 16 by the screws or bolts 93. Attention is directed to the fact that this attaching head 92 is secured to the housing 16 at a point in relatively close proximity to the rear end of the housing, which affords the desired overhang of the fan 14 and fan guard 21 beyond the front edge of the pedestal base 24. The advantage of this overhang is illustrated in Figures 1 and 2, which show the fan discharging air to the outdoors through an open window. A panel 95 composed of plywood or any other desired material is set into the window opening, such as between the sill rail 97 and one of the sash 98. This panel has a large circular opening 96 cut therein, of appropriate size to permit the fan 14 and fan guard 21 to be extended substantially into or through this opening. As shown in Figure 2, the substantial degree of overhang of the fan 14 and guard 21 beyond the adjacent edge of the pedestal base 24 permits the fan and fan guard to be thus extended into or through the panel opening 96, while the pedestal base 24 still rests on the floor within the room. If desired, the fan guard 21 can be arranged to have resting support in the panel opening 96 or on the window sill 97. When the device is removed from the opening in the window panel, for general utility as a circulating fan (Figure 3), the unit remains supported in stable equilibrium because the center of gravity of the unit is well within the front edge of the pedestal base.

The entire unit can be disassembled into a plurality of relatively small parts, thereby enabling the device to be shipped in compact knocked-down form, for complete assembly by the purchaser. For example, the fan 14 is removable from the shaft 15, the fan guard 21 is removable from the fan shaft housing 16; the belt drive housing 17 is removable from the fan shaft housing 16; the motor 19 is removable from the housing 15; the supporting pedestal 23 is removable from the housing 15; the tube 25 is removable from the base 24, etc. The fan 14 may be constructed in accordance with the disclosures in either of my prior Patents Nos. 2,068,957; 2,035,479, or Design 102,083; or it may be of any other preferred construction.

While I have illustrated and described what I regard to be the preferred embodiment of my invention, nevertheless it will be understood that such is merely exemplary and that numerous modifications and rearrangements may be made therein without departing from the essence of the invention.

I claim:

1. A supporting pedestal comprising a base and an adjustable standard rising from said base, said standard comprising inner and outer supporting tubes capable of relative telescopic movement, a head member carried by said outer tube, an internal annular groove in said head member, a ring of pliable friction material in said groove and engaging with said inner tube, and means for exerting a fractional clamping pressure against said inner tube through said ring of friction material.

2. A supporting pedestal comprising a base and an adjustable standard rising from said base, said standard comprising inner and outer vertical tubes capable of relative telescopic movement, a head member carried by said outer tube, a pressure screw having threaded mounting in said head member, a substantially elliptical opening in said head member for receiving said inner tube, said opening being elongated substantially in the vertical transverse plane of said pressure screw, and friction means in said opening for transmitting the pressure of said screw to said inner tube.

3. In a supporting pedestal, the combination of a pedestal base for resting on the floor, a standard rising from said pedestal base, said standard comprising upper and lower telescopic tubes adapted to afford vertical adjustment, a head member carried at the upper end of said lower tube, said upper tube having telescopic movement within said head member, a pressure screw having threaded mounting in said head member, a substantially elliptical opening in said head member for receiving said upper tube, said opening being elongated substantially in the vertical transverse plane of said pressure screw, an internal annular groove in said head member substantially in the horizontal transverse plane of said pressure screw, said groove being elongated substantially in the same direction as said opening, a ring of pliable friction material in said groove and engaging with said upper tube, and an arcuate pressure block transmitting frictional clamping pressure from said pressure screw to said upper tube through said ring of friction material.

4. In a supporting stand for a motor driven fan, the combination of a base adapted to rest on the floor, an adjustable standard rising from said base for supporting said motor driven fan, said standard comprising inner and outer supporting tubes capable of relative telescopic movement, a head member carried by said outer tube, an internal annular groove in said head member, a ring of pliable friction material in said groove and engaging with said inner tube, and means for exerting a frictional clamping pressure against said inner tube through said ring of friction material.

5. In a portable supporting stand for a motor driven fan, the combination of a base adapted to rest on the floor, an adjustable standard rising from said base for supporting the motor driven fan, said standard comprising inner and outer vertical tubes capable of relative telescopic movement, a head member carried by said outer tube, a pressure screw having threaded mounting in said head member, a substantially elliptical opening in said head member for receiving said inner tube, said opening being elongated substantially in the vertical transverse plane of said pressure screw, and friction means in said opening for transmitting the pressure of said screw to said inner tube.

6. In a portable supporting stand for a motor driven fan, the combination of a pedestal base for resting on the floor, a standard rising from said pedestal base and supporting said motor driven fan, said standard comprising upper and lower telescopic tubes adapted to afford vertical adjustment of the fan, a head member carried at the upper end of said lower tube, said upper tube having telescopic movement within said head member, a pressure screw having threaded mounting in said head member, a substantially elliptical opening in said head member for receiving said upper tube, said opening being elongated substantially in the vertical transverse plane of said pressure screw, an internal annular groove in said head member substantially in the horizontal transverse plane of said pressure screw, said groove being elongated substantially in the same direction as said opening, a ring of pliable friction material in said groove and engaging with said upper tube, and an arcuate pressure block transmitting frictional clamping pressure from said pressure screw to said upper tube through said ring of friction material.

HERMAN C. HUEGLIN.